United States Patent [19]

Haughton et al.

[11] Patent Number: 5,396,553
[45] Date of Patent: Mar. 7, 1995

[54] AUTOMATIC LOSS CONTROL CIRCUIT

[75] Inventors: Lance J. Haughton, Parsippany Township, Morris County; David R. Rice, Chatham, both of N.J.

[73] Assignee: AT&T Corp., Murray Hill, N.J.

[21] Appl. No.: 84,040

[22] Filed: Jun. 28, 1993

[51] Int. Cl.6 .......................... H04M 1/00; H04M 7/04
[52] U.S. Cl. ..................................... 379/401; 379/400; 379/398
[58] Field of Search ............... 379/401, 400, 398, 399, 379/340, 344, 347

[56] References Cited

U.S. PATENT DOCUMENTS 3,881,066  4/1975  Macrander et al. ............ 379/400 X
4,320,257  3/1982  Warman .......................... 379/400 X
4,588,856  5/1986  Cohen ............................. 379/398 X
5,275,705  12/1993 Haughton et al. ................. 379/401

Primary Examiner—James L. Dwyer
Assistant Examiner—Paul A. Fournier
Attorney, Agent, or Firm—Lester H. Birnbaum

[57] ABSTRACT

Disclosed is a circuit for providing an appropriate amount of on-hook loss in a digital loop carder transmission system serving telephone customers. The resistance of the customer loop is measured while the customer is off-hook and an amount of loss is added based on that resistance during the off-hook interval. A predetermined constant loss is then added to the appropriate off-hook loss when the equipment returns to on-hook status.

8 Claims, 2 Drawing Sheets

AUTOMATIC LOSS CONTROL CIRCUIT

BACKGROUND OF THE INVENTION

This invention relates to digital loop carrier transmission systems.

In a typical digital loop carrier transmission system, such as Subscriber Loop Carrier (SLC®) systems, digital transmission takes place between a local digital switch and a remote terminal. The customer lines, or loops, couple customer premises equipment, such as standard telephones, to the remote terminal through channel units located at the remote terminal.

Due to variations in the lengths of the loops, it has been recognized that it is often necessary to add a certain amount of loss to the signals between the remote terminal and the customer equipment in both the off-hook and on-hook states in order to protect against too loud a signal for the shorter loops. In the case of the on-hook state, the standard approach has been to add a constant amount of loss to all customers coupled to the remote terminal. This has been effective in the past since there was a minimal amount of reflection back to the switch. While such an approach has worked for most systems, problems have arisen, for example, in systems employing caller identification routines. In such systems, frequency shift key (FSK) signals are delivered to the customer equipment in the on-hook state. Because of the high impedance of the customer equipment, all or most of the incoming signal is reflected back toward the switch. Due to the poor trans-hybrid loss of the central office terminal (COT) channel unit and/or significant reflective coefficient of the switch, the reflected signal is, in turn, reflected back to the remote terminal where it can interfere with the next incoming bit and produce an error. Adding a constant on-hook loss to all loops does not alleviate this condition since the combination of channel unit loss and cable loss could exceed the maximum loss allowable (13 dB) for some loops, and a low on-hook loss would not ensure caller ID reliability.

SUMMARY OF THE INVENTION

The invention is a circuit for automatic adjustment of signal loss in loops of a digital loop transmission system. The circuit includes means for detecting a resistance of a loop when the customer equipment in that loop is off-hook. A microprocessor is coupled to the detection means and includes means for determining an amount of loss to be applied to the loop as a function of the detected resistance while the equipment is off-hook. The microprocessor also includes means for adding a constant amount of loss to said determined amount of loss while the equipment is on-hook.

BRIEF DESCRIPTION OF THE DRAWING

These and other features are delineated in detail in the following description. In the drawing.

DETAILED DESCRIPTION

Figure 1:
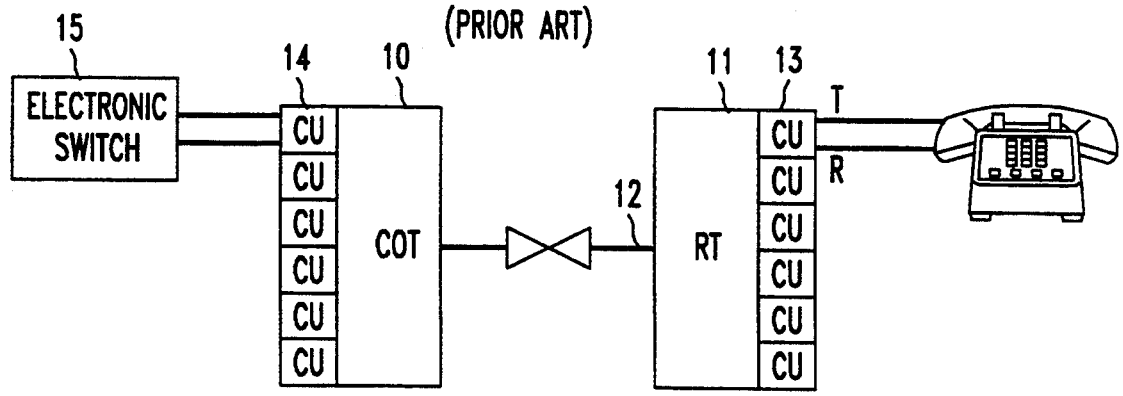
FIG. 1 is a block diagram of a typical digital loop carrier transmission system in accordance with the prior art.

FIG. 1 illustrates a typical digital loop carrier transmission system, such as a SLC® System, where digital signals are transmitted over a bidirectional link, 12, between a central office terminal (COT), 10, usually located in a central office, and a remote terminal (RT), 11, located in the vicinity of a group of customers. The COT is coupled through a series of channel units (CUs), e.g., 14, to a switch 15 which can be electronic, mechanical or electro-mechanical. The customers are coupled to the system at the remote terminal by means of pairs of copper wires designated tip (T) and ring (R), also referred to as the customer loop. A series of channel units (CU), e.g., 13, provide the interface between the customers and the remote terminal, with each channel unit being coupled to one-to-four customer lines.

Since the customers will be located at varying distances from the remote terminal, and the type of cable utilized by each customer can vary, the resistance of the loop of each customer will also vary. Thus, when a call is initiated, it is desirable for the system to determine the loop resistance and adjust the loss (or gain) of the signals to the customer accordingly. Such loss control has been described for intervals where the customer equipment is off-hook in U.S. Patent Application of Haughton and Yon, Ser. No. 07/704,501 filed May 23, 1991, which is incorporated by reference herein.

In accordance with a main feature of the invention, a variable loss can be applied to each customer loop when the equipment is on-hook by utilizing automatic loss control techniques when the equipment is off-hook.

Figure 2:
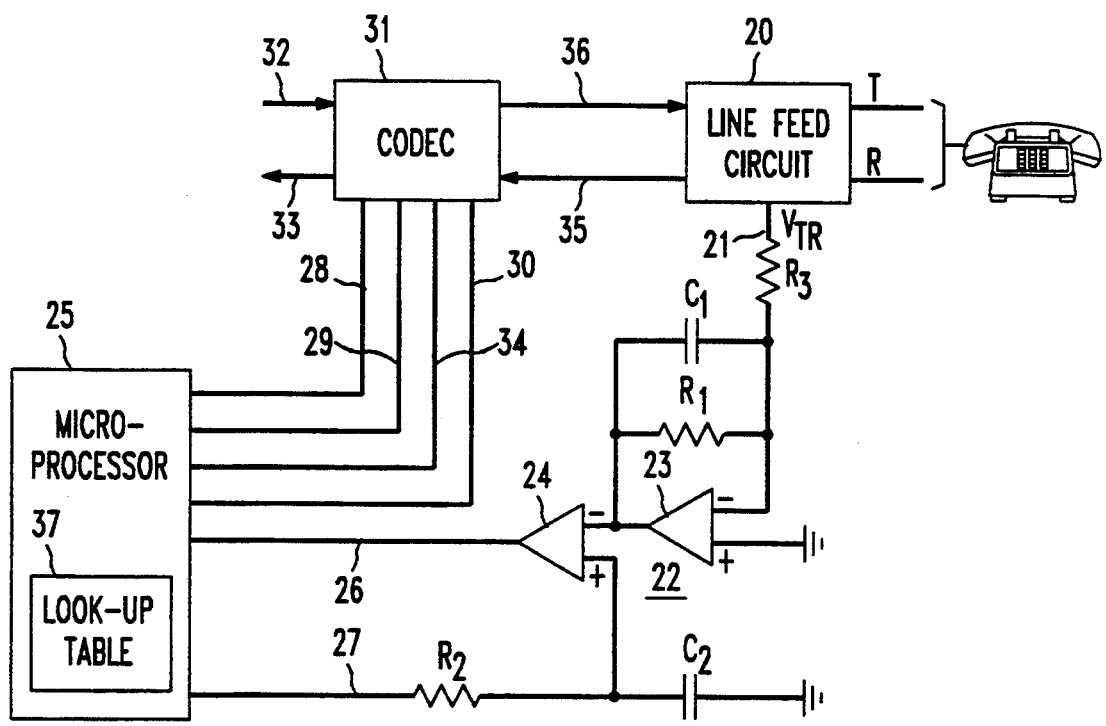
FIG. 2 is a block diagram illustrating components of a circuit in accordance with an embodiment of the invention.

FIG. 2 illustrates one example of a circuit for providing on-hook loss in accordance with the invention. The circuit would typically be located in each channel unit (e.g., 13) in the remote terminal 11. It will be noted that, in most respects, the circuit is identical to that shown in U.S. patent application of Haughton and Yon, cited supra.

The tip (T) and ring (R) conductors of each customer are coupled to a line feed circuit, 20, whose function is to provide a constant current to the loop upon call initiation and then to determine the DC voltage across tip and ting. The determination of the voltage provides a measurement of the total resistance of the loop according to Ohm's law. The typical current supplied is approximately 30 m AMP.

A scaled version $V_{TR}$ of the measured DC voltage across tip and ting appears at an output conductor 21 of the line feed circuit. This scaled voltage is coupled through a resistor $R_3$ to the negative input of an amplifier 23, whose positive input is grounded. The amplifier feedback loop comprises a parallel connection of a resistor $R_1$ and capacitor $C_1$. The combination of amplifier 23, resistors $R_1$ and $R_3$, and capacitor $C_1$ comprises a filter 22 which serves to filter out any AC signal induced onto the incoming signal from adjacent power lines.

The filtered voltage $V_{TR}$ is coupled to the negative input of a comparator 24 whose positive input is coupled to ground through a capacitor $C_2$. The output of the comparator 24 is coupled to an input of a standard microprocessor 25 by means of conductor 26. An output of the microprocessor 25 is also coupled via conductor 27 through $R_2$ to one plate of capacitor $C_2$.

Further outputs of the microprocessor 25 are provided on conductors 28, 29, 30, and 34 to an analog/digital converter (CODEC), 31, with programmable gain. Typically, conductor 28 serves as a chip select lead since there may be more than one CODEC in each circuit. Conductor 29 could be a clock lead, while conductors 30 and 34 constitute the data input and output leads, respectively. The CODEC also has coupled thereto a conductor 35 which transmits analog signals thereto from the line feed circuit 20 and a conductor 33 which transmits digital signals to other equipment in the remote terminal. Conductor 32 transmits digital signals to the CODEC from other equipment, and conductor 36 transmits analog signals to the line feed circuit 20.

The microprocessor 25 includes a look-up table 37, which contains the amount of off-hook loss which should be added to the customer loop based on the resistance of that customer loop. The microprocessor also includes firmware in order to add an appropriate amount of on-hook loss as described below.

Figure 3:
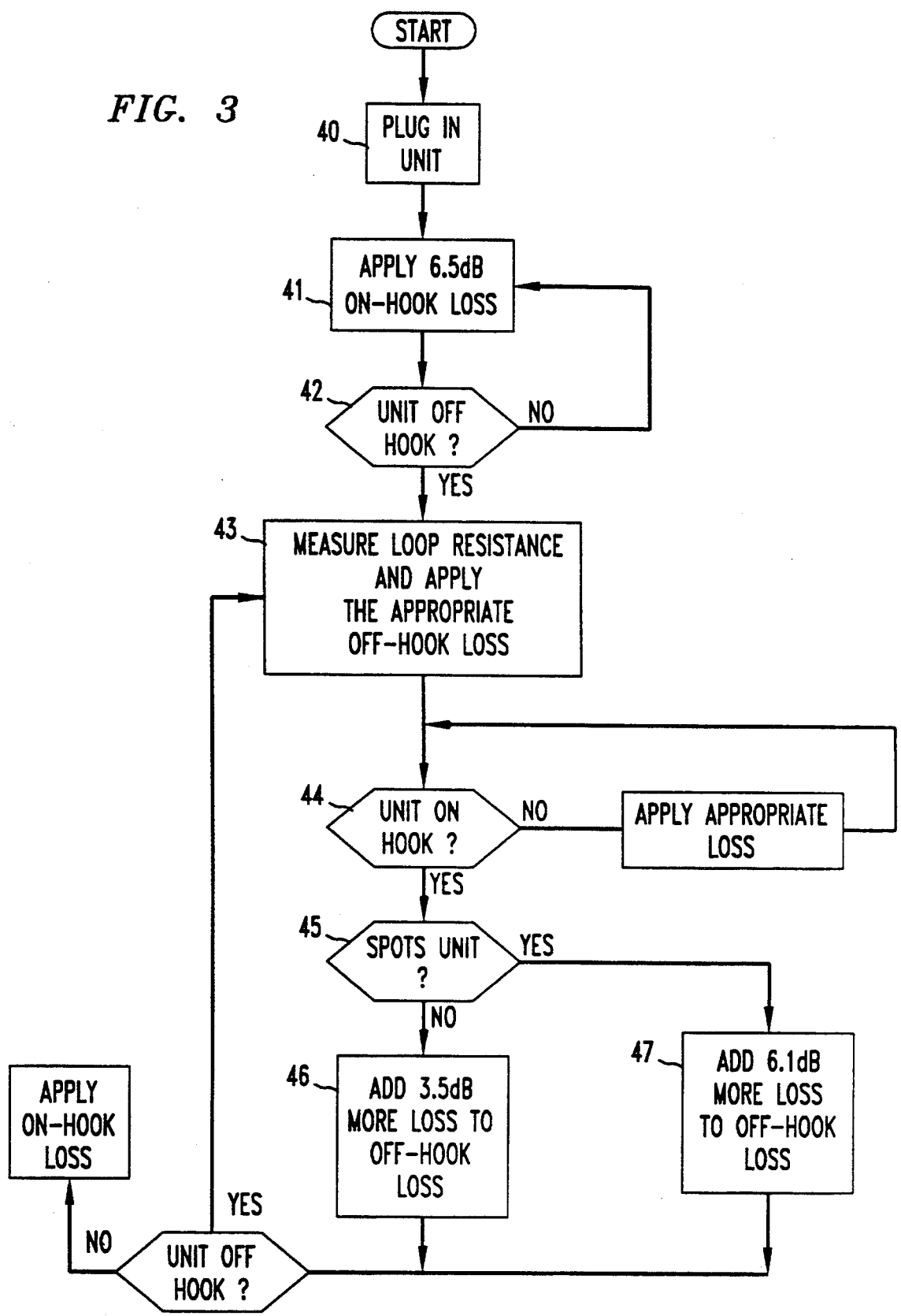
FIG. 3 is a flow chart illustrating some of the operations of the circuit of FIG. 2.

The operation of the circuit of FIG. 2 will now be described with further reference to the flow diagram of FIG. 3. When a channel unit (e.g., 13 of FIG. 1) is first plugged into the system, step 40, the microprocessor 25 will signal the CODEC 31 on line 30 to apply a constant on-hook loss to the customer equipment as illustrated by step 41. In this particular example, an on-hook loss of 6.5 dB is chosen as a useful first approximation of the loss which will be needed. The microprocessor 24 will then determine when the customer goes off-hook, as illustrated by decision step 42. Once the customer goes off-hook, the circuit will measure the loop resistance and apply the appropriate off-hook loss from the look-up table 37 based on the measured resistance as shown in step 43.

Step 43 is accomplished by the line feed circuit 20 sending a constant current on the tip and ring leads and measuring the voltage, $V_{TR}$, produced on the loop. The voltage $V_{TR}$ is filtered by filter 22 and applied to the comparator 24. The microprocessor 25 detects the voltage $V_{TR}$ by charging up capacitor $C_2$ to produce a voltage at the positive input of the comparator, and then determining at what charging voltage the output of the comparator changes state. The microprocessor is able, thereby, to detect the resistance on the loop. Based on the resistance and the loss values stored in the look-up table 37, the microprocessor will send a signal to CODEC 31 to adjust the gain accordingly. (For a more detailed discussion of this step, see U.S. Patent Application of Haughton and Yon, cited supra.)

As indicated by decision step 44, the microprocessor will then determine at what point the customer goes back on-hook. The channel units in this example are divided into those used for plain old telephone service (POTS) and those used for enhanced, or super POTS, service (SPOTS). Consequently, the microprocessor 25 must determine whether it is contained within a channel unit used in POTS or SPOTS service. This determination is indicated by decision step 45. The microprocessor will then add a predetermined amount of on-hook loss to the previously determined off-hook loss. This predetermined amount of on-hook loss will be different for different types of service in order to achieve approximately the same on-hook loss for each service type (since the off-hook loss differs by type of service). In this example, if the customer has POTS, an on-hook loss of 3.5 dB is added to the off-hook loss, as indicated by step 46. In the case of SPOTS, as shown in step 47, an additional 6.1 dB loss is applied to the off-hook loss.

It will be appreciated, therefore, that each customer will receive an appropriate amount of on-hook loss which varies with the resistance of the customer loop.

It will also be appreciated that other methods of detecting loop resistance can be utilized in accordance with the invention. For example, an analog/digital converter can be coupled between the filter 22 and microprocessor 25 to supply the detected voltage ($V_{TR}$) to the microprocessor.

Various additional modifications will become apparent to those skilled in the art. All such variations which basically rely on the teachings through which the invention has advanced the art are properly considered within the scope of the invention.

We claim:

1. A circuit for automatic adjustment of signal loss in loops of a digital loop transmission system comprising:
   means for detecting a resistance of a loop when customer equipment in that loop is off-hook; and
   a microprocessor coupled to the detection means and including means for determining an amount of loss to be applied to the loop as a function of the detected resistance while the equipment is off-hook, the microprocessor also including means for adding a constant amount of loss to said determined amount of loss while the equipment is on-hook such that the total loss applied to the loop while the equipment is on-hook is a function of the detected resistance of the loop.

2. The circuit according to claim 1 further comprising a programmable analog/digital converter having an input coupled to the microprocessor and an output providing an analog signal to the loop such that the signal level is adjusted in accordance with the microprocessor output.

3. The circuit according to claim 1 wherein the means for determining the loss to be applied while equipment is off-hook comprises a look-up table.

4. The circuit according to claim 1 wherein the means for detecting a resistance comprises a line feed circuit adapted to provide a constant current to the loop when the equipment goes off-hook and to provide the resulting voltage in the loop on a conductor which is coupled to one input of a comparator.

5. The circuit according to claim 4 wherein another input of the comparator is coupled to a capacitor, an output of the comparator is coupled to the microprocessor, and an output of the microprocess or is coupled to the capacitor so that the microprocessor can charge up the capacitor.

6. The circuit according to claim 4 wherein the conductor is coupled to the comparator through a filter.

7. The circuit according to claim 1 wherein the microprocessor further comprises means for determining the type of service applied to the loop and for adding a constant amount of loss which is dependent upon the type of service.

8. The circuit according to claim 1 wherein the circuit is part of a channel unit, and the microprocessor further comprises means for adding another constant amount of loss when the unit is first plugged into the system until the customer equipment goes off-hook.

* * * * *